United States Patent
Gauba

(10) Patent No.: US 9,042,852 B1
(45) Date of Patent: May 26, 2015

(54) SYSTEMS AND METHODS FOR ADJUSTING A SENSITIVITY THRESHOLD OF A WIRELESS COMMUNICATION DEVICE

(71) Applicant: Sprint Spectrum L.P., Overland Park, KS (US)

(72) Inventor: Maneesh Gauba, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 199 days.

(21) Appl. No.: 13/736,743

(22) Filed: Jan. 8, 2013

(51) Int. Cl.
*H04W 52/02* (2009.01)
*H04W 24/02* (2009.01)

(52) U.S. Cl.
CPC .......... *H04W 52/0245* (2013.01); *H04W 24/02* (2013.01)

(58) Field of Classification Search
CPC ..... H04W 28/08; H04W 24/00; H04W 16/06; H04W 52/0245
USPC .............................. 455/453, 454, 226.3, 254
See application file for complete search history.

(56) References Cited

U.S. PATENT DOCUMENTS

| 7,945,210 | B2 | 5/2011 | Aue |
| 8,249,641 | B1 | 8/2012 | Khanka |
| 2006/0046739 | A1 * | 3/2006 | Blosco et al. .................. 455/453 |
| 2007/0223626 | A1 | 9/2007 | Waxman |
| 2012/0257512 | A1 * | 10/2012 | Lim .............................. 370/242 |

\* cited by examiner

*Primary Examiner* — Christian Hannon

(57) ABSTRACT

Disclosed herein are systems and methods for adjusting a sensitivity threshold of a wireless communication device (WCD). In an embodiment, a WCD measures both a signal power level of a received signal and a noise power level. The WCD also makes a sensitivity-adjustment determination, which includes (i) a determination that the signal power level is less than a current sensitivity threshold of the receiver of the WCD and (ii) a determination that a signal-to-noise ratio (SNR) of the signal power level to the noise power level is greater than an SNR threshold. Responsive to making the sensitivity-adjustment determination, the WCD adjusts its receiver from having the current sensitivity threshold to having an adjusted sensitivity threshold that is less than or equal to the signal power level.

19 Claims, 4 Drawing Sheets

SYSTEMS AND METHODS FOR ADJUSTING A SENSITIVITY THRESHOLD OF A WIRELESS COMMUNICATION DEVICE

BACKGROUND

The use of cellular phones and other types of wireless communication devices (WCDs) is becoming increasingly prevalent and popular in modern life. To provide cellular wireless communication service to such WCDs (also often referred to as client devices, user equipment, mobile stations, subscriber devices, access terminals, and the like), a wireless service provider typically operates a radio access network (RAN) that defines coverage areas (e.g., cells, sectors, and the like) in which subscribers' WCDs can be served by the RAN and obtain connectivity to other networks such as the public switched telephone network (PSTN) and the Internet.

A typical RAN includes one or more base transceiver stations (BTSs), each of which may radiate to define one or more coverage areas in which these WCDs can operate. Further, the RAN may include one or more radio network controllers (RNCs) or the like, which may be integrated with or otherwise in communication with the BTSs, and which may include or be in communication with one or more switches and/or gateways that provide connectivity with one or more transport networks. Conveniently, with this arrangement, a WCD that is positioned within the coverage of the RAN can communicate with a BTS and in turn with other served devices and/or with other entities via the one or more transport networks.

In each coverage area, a RAN will typically broadcast (via, e.g., a BTS) a pilot signal that among other purposes notifies WCDs of the presence of the coverage area. In operation, when a WCD detects a pilot signal of sufficient strength, the WCD may transmit what is known as a registration message to the RAN to notify the RAN that the device is in the coverage area, and the device may then operate in the coverage area in what is typically known as "idle" mode. When operating in idle mode, the WCD is not actively engaged in a call or other traffic (e.g., packet-data) communication, but does regularly monitor overhead signals in the coverage area to obtain system information and page messages, as examples.

OVERVIEW

Wireless communications networks often use procedures for controlling the signal quality and transmit power levels of forward-link signals (i.e., signals transmitted from a base station to a WCD) and/or reverse-link signals (i.e., signals transmitted from a WCD to a base station). For example, in a Long Term Evolution (LTE) network, each WCD typically maintains a receiver-sensitivity threshold. In some instances, this sensitivity threshold represents the minimum power level at which a WCD must receive a forward-link signal so that the WCD can process the signal. In such instances, the WCD will not be able to process forward-link signals received at a power level below the sensitivity threshold. In other instances, a given receiver of a given WCD will have a sensitivity threshold set to some offset above the aforementioned minimum power level. Using either approach, WCDs are typically arranged to not process signals received at power levels that are less than the respective sensitivity thresholds of their respective receivers.

Additionally, when a forward-link signal is received, the receiver of a WCD also receives some noise. As known in the art, the ratio (or logarithmic (i.e., decibel) difference) between the as-received power level of a signal and the noise is known as a signal-to-noise ratio (SNR). Depending on a signal-processing mode of the receiver, the SNR may need to be above a threshold level for the receiver to be able to decode data. Thus, in a typical arrangement, to be able to properly receive and decode a signal, a receiver of a WCD must (i) receive the signal at a power level at or above its sensitivity threshold and (ii) detect an amount of noise that results in the SNR meeting or exceeding an SNR threshold.

A given WCD is often able to communicate to a base station both the as-received forward-link signal power level and the SNR as measured by the WCD. In response to receiving such a communication, the base station may adjust (e.g., increase) the as-transmitted power level of the forward-link signal. By increasing the as-transmitted power level, the base station may increase both the as-received forward-link signal power level and the SNR measured by the WCD. However, in some instances, the base station may not be able to further increase the forward-link power level, such as if the base station has already reached an allowed maximum.

To address these problems as well as others, presently disclosed are systems and methods for adjusting a sensitivity threshold of a WCD. One embodiment takes the form of a method carried out by a WCD having a receiver. The method includes the wireless communication device adjusting the sensitivity threshold of the receiver. In some instances, such a method may be carried out in response to a determination that a base station has already reached an allowed-maximum level of as-transmitted power with respect to a forward-link signal.

In accordance with an example embodiment, a WCD measures both a signal power level of a received signal and a noise power level. In this embodiment, the WCD also makes a sensitivity-adjustment determination, which includes (i) a determination that the signal power level is less than a current sensitivity threshold of the receiver and (ii) a determination that an SNR of the signal power level to the noise power level is greater than an SNR threshold. Finally in this embodiment, and responsive to making the sensitivity-adjustment determination, the WCD adjusts the receiver from having the current sensitivity threshold to having an adjusted sensitivity threshold that is less than or equal to the signal power level.

Another embodiment takes the form of a WCD that includes at least one wireless-communication interface having a receiver, at least one processor, and data storage containing program instructions executable by the at least one processor for carrying out such a method.

In various different embodiments, the WCD may adjust the sensitivity threshold of the receiver at least in part by reducing a bandwidth of the receiver. The sensitivity threshold may be calculated by a mathematical function wherein the sensitivity threshold is directly related (e.g., proportional) to the bandwidth of the receiver. In such a case, therefore, a reduction in the bandwidth of the receiver results in a reduction of the sensitivity threshold of the receiver. When the sensitivity threshold decreases, the WCD may be able to detect a weaker forward-link signal. Further, the WCD may measure the noise power level that it uses to calculate an output SNR (oSNR) over the bandwidth of the receiver. By reducing the bandwidth over which noise is measured by the WCD, the amount of noise measured by the WCD will decrease, which would typically result in an increase in the calculated oSNR.

Additionally or instead, in various embodiments, the WCD may adjust the sensitivity of the receiver by reducing the oSNR threshold of the receiver. During operation of the WCD, the receiver introduces additional noise to the signal. The oSNR is a measurement of the SNR after the receiver has processed the received signal (i.e., the oSNR measurement accounts for both received radio noise and noise introduced by the receiver). For a signal to be properly decodable, the measured oSNR must meet or exceed the oSNR threshold of the receiver.

Furthermore, a current oSNR threshold of a given receiver typically corresponds to a signaling mode being used by both transmitter (base station) and receiver (WCD) to encode and decode the data, respectively. The WCD and/or the base station may select—perhaps by negotiation, convention, or other mechanism—a current signaling mode from a group of possible signaling modes. Each signaling mode has an associated respective oSNR threshold that a given receiver must meet or exceed in order to properly decode a signal; as such, a change in signaling mode would typically be accompanied by a change in oSNR threshold at the receiver.

In general, signaling modes that involve relatively more complex modulation schemes are associated with relatively higher oSNR thresholds, while signaling modes that involve relatively less complex modulation schemes are associated with relatively lower oSNR thresholds. Because the sensitivity threshold of a receiver is directly related (e.g., proportional) to the required oSNR threshold, changing a signaling mode (and thus the oSNR threshold) typically effects a change in the sensitivity threshold for a given receiver.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Architecture

A. Example Communication System

Figure 1:
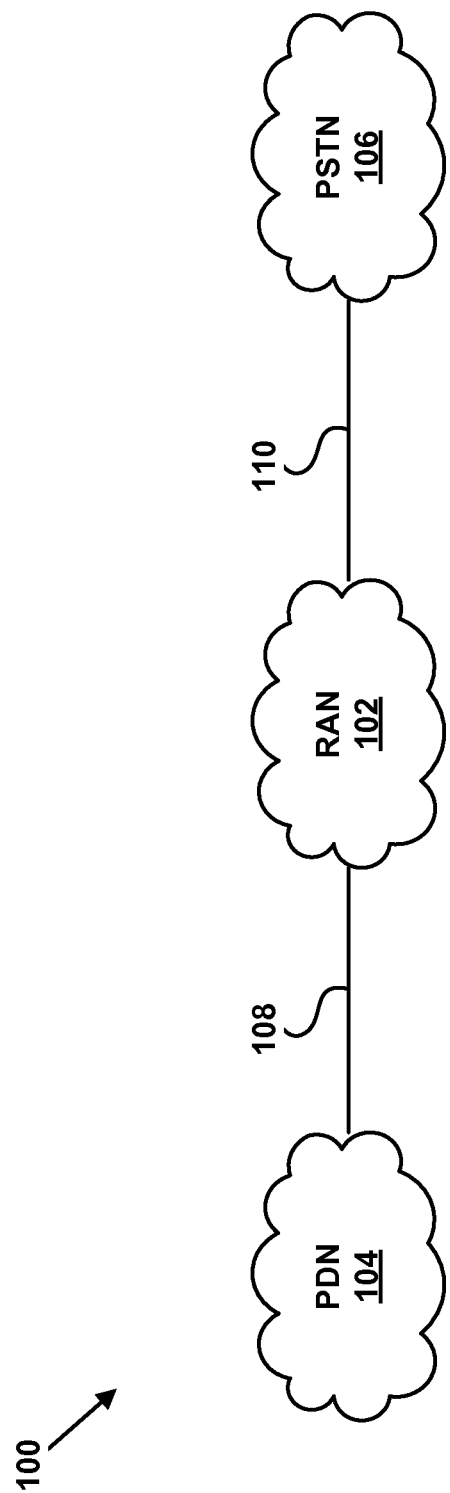
FIG. 1 is a simplified diagram depicting an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

B. Example Radio Access Network (RAN)

Figure 2:
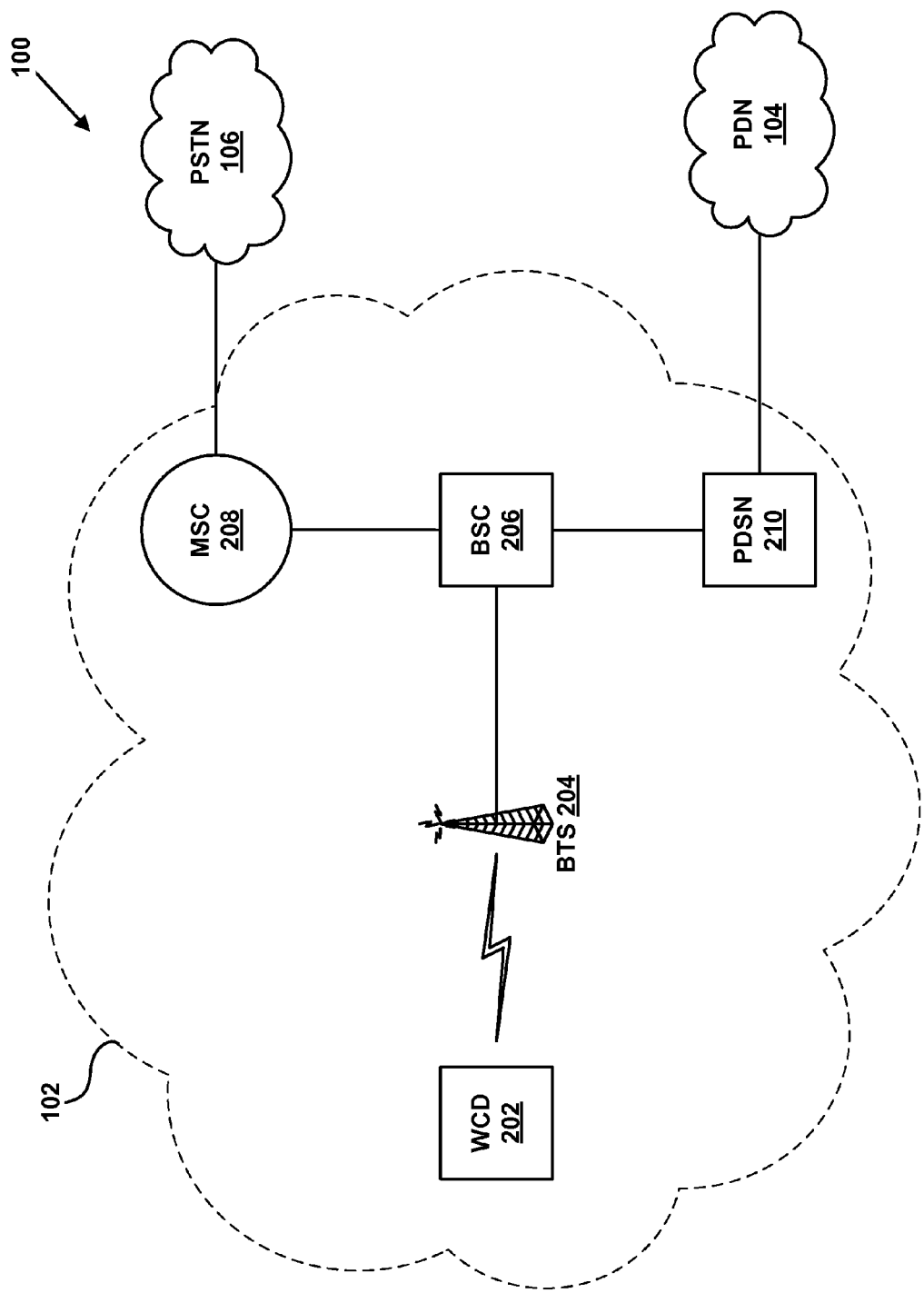
FIG. 2 is a simplified diagram depicting an example radio access network (RAN) in the context of the example communication system of FIG. 1.

FIG. 2 depicts communication system 100 with a more detailed depiction of RAN 102, which is shown in this example as serving a representative WCD 202 and including a BTS 204, a base station controller (BSC) 206, a mobile switching center (MSC) 208, and a packet data serving node (PDSN) 210. Additional entities could also be present; for example, there could be additional WCDs in communication with BTS 204; as another example, there could be additional entities in communication with PDN 104 and/or PSTN 106. Also, there could be one or more routers, switches, and/or other devices or networks making up at least part of one or more of the communication links. And other variations are possible as well. Further, RAN 102 may be arranged to operate according to LTE and/or one or more other suitable wireless protocols, some representative examples being Code Division Multiple Access (CDMA), Global System for Mobile (GSM), IEEE 802.11, IEEE 802.16 (WIMAX), EV-DO, and the like.

WCD 202 may be any device arranged to carry out the WCD functions described herein, and may include a user interface, a wireless-communication interface, a processor, and data storage containing instructions executable by the processor for carrying out those functions. The user interface may include buttons, a touchscreen, a microphone, and/or any other elements for receiving inputs, as well as a speaker, one or more displays, and/or any other elements for communicating outputs.

BTS 204 may be any network element arranged to carry out the BTS functions described herein. As such, BTS 204 may include a communication interface, a processor, and data storage containing instructions executable by the processor to carry out those functions. The communication interface may include one or more antennas, chipsets, and/or other components for providing one or more coverage areas such as cells and sectors, for communicating with WCD 202 over an air interface. The communication interface may be arranged to communicate according to one or more protocols mentioned herein and/or any others now known or later developed. The communication interface may also include one or more wired and/or wireless interfaces for communicating with at least BSC 206.

BSC 206 may be any network element arranged to carry out the BSC functions described herein. As such, BSC 206 may include a communication interface, a processor, and data storage containing instructions executable by the processor to carry out those functions. The communication interface may include one or more wired and/or wireless interfaces for communicating with at least BTS 204, MSC 208, and PDSN 210. In general, BSC 206 functions to control one or more BTSs such as BTS 204, and to provide one or more BTSs such as BTS 204 with connections to devices such as MSC 208 and PDSN 210. Note that, as used herein, "base station" may mean a BTS, or may mean a combination of a BTS and a BSC. In general, the RAN 102 could include any number of BTSs communicating with any number of BSCs.

C. Example Wireless Communication Device (WCD)

Figure 3:
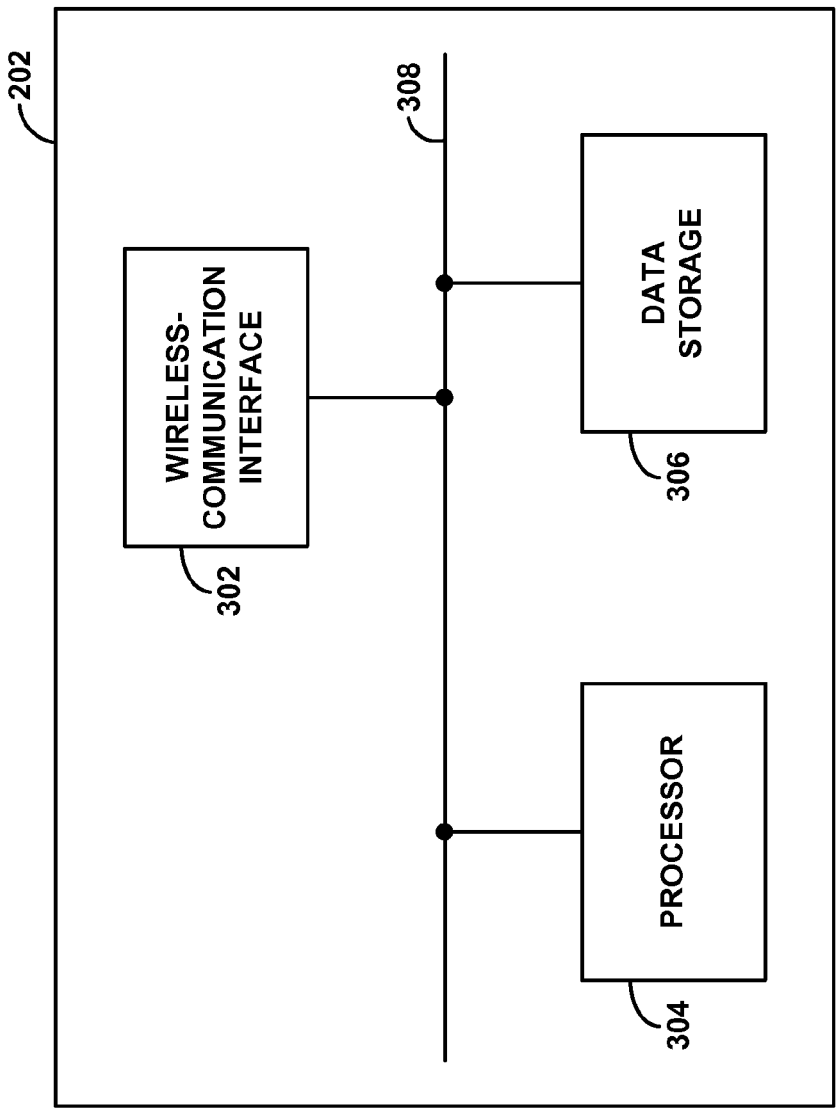
FIG. 3 is a simplified diagram depicting an example wireless communication device (WCD).

FIG. 3 depicts WCD 202 as including a wireless-communication interface 302, a processor 304, and data storage 306, all of which may be coupled together by a system bus, network, or other connection mechanism 308.

Wireless-communication interface 302 may comprise one or more antennae and one or more chipsets for communicating with one or more base stations over respective air interfaces. As an example, one such chipset could be one that is suitable for LTE communication. The chipset or wireless-communication interface in general may also or instead be arranged to communicate according to one or more other types (e.g. protocols) mentioned herein and/or any others now known or later developed. The processor and data storage may be any suitable components known to those of skill in the art. As examples, WCD 300 could be or include a cell phone, a smartphone, a tablet, and the like.

Processor 304 may comprise one or more general-purpose processors and/or one or more special-purpose processors, and may be integrated in whole or in part with wireless-communication interface 302. Data storage 306 may comprise one or more volatile and/or non-volatile storage components (such as magnetic, optical, flash, or other non-transitory storage) and may be integrated in whole or in part with processor 304. And certainly other configurations are possible. Data storage 306 may contain program instructions executable by processor 304 to for carrying out various WCD functions described herein.

III. Example Operation

Figure 4:
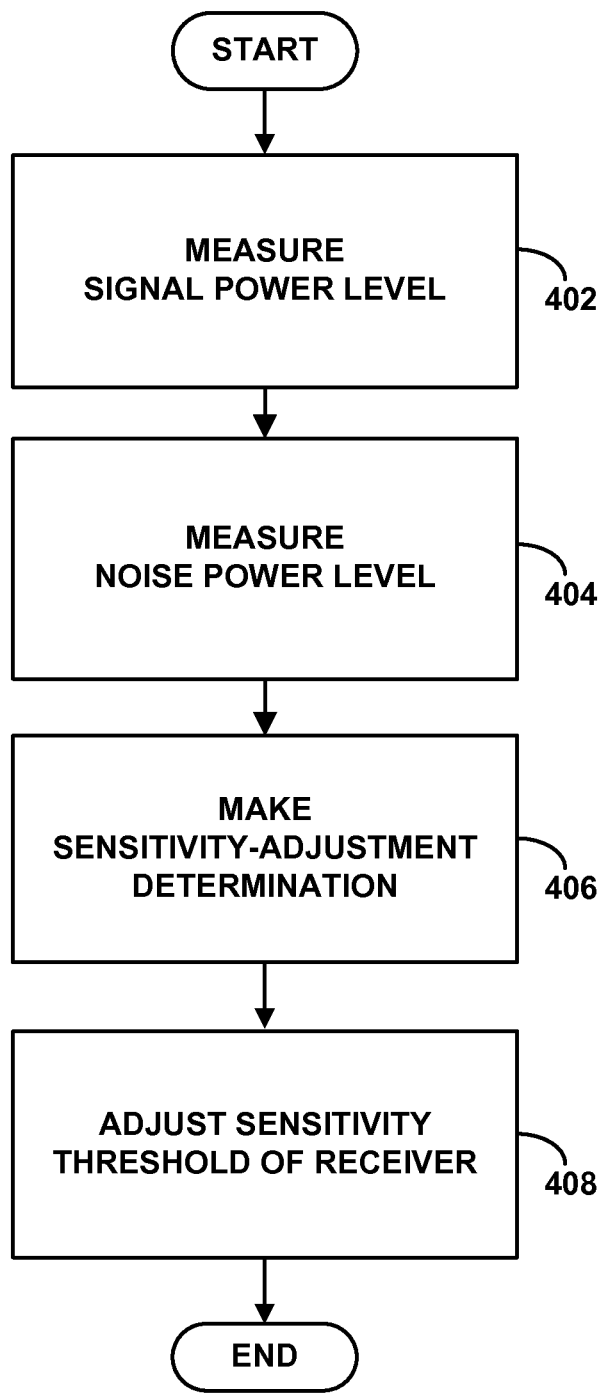
FIG. 4 is flowchart depicting functions that are carried out in accordance with at least one embodiment.

FIG. 4 is a flowchart depicting in summary some of the functions carried out by the WCD 202 in accordance with an example method. Although the blocks of FIG. 4 are illustrated in a sequential order, the blocks may also be performed in parallel and/or in a different order than is described herein. Also, the various blocks may be combined into fewer blocks, divided into additional blocks, and/or eliminated based upon the desired implementation.

A. WCD Measures Signal Power Level of Received Signal

As shown in FIG. 4, at block 402, the WCD 202 measures a signal power level of a received signal, which may be associated with a communication session (such as a voice call or data session on a traffic channel, as examples) and/or involve signaling (e.g., paging) data, and may instead or in addition involve one or more types of information communication of any suitable variety.

B. WCD Measures Signal Power Level

At block 404, the WCD 202 measures a noise power level. To measure the noise power level, the WCD 202 may take a measurement of all the received radio power (e.g., on a given frequency) that is not part of the received signal. This may include signals that are being communicated from the BTS 204 to WCDs other than WCD 202. Thus, noise may include any signal present in an environment that is not the particular signal whose as-received power is measured at block 402. Instead or in addition, the noise power level may include noise that is produced within the WCD 202 itself. That is, electronics in a receiver and/or transceiver (i.e., a unit comprising both a transmitter and a receiver) located within WCD 202 may introduce some noise into the signal path and may account for at least some of the measured noise power level.

In at least one embodiment, the WCD 202 may measure the noise power level across a bandwidth of its receiver. In some embodiments, a receiver has a fixed bandwidth (i.e., the bandwidth does not change during operation of the receiver). However, in other embodiments, the receiver may change its bandwidth. In some embodiments, the receiver may have two different frequency bands over which it can receive communication. For example, the receiver may be able to receive communications on both an 800 MHz frequency band and a 1900 MHz frequency band. However, a typical receiver can only operate in one frequency band at a time, and thus the bandwidth over which noise is measured would be the bandwidth associated with the current frequency band of operation.

In at least one embodiment, the receiver may be able to adjust the bandwidth of operation within a frequency band. For example, the receiver may operate in the 800 MHz band. As an example, the received signal may have a frequency located near the lower portion of the 800 MHz band. The receiver may adjust its bandwidth to only contain the lower portion of the 800 MHz band, including the received signal's frequency. Thus, in that example, the bandwidth over which the receiver measures noise is the bandwidth associated with the lower portion of the 800 MHz band. The changing bandwidth is described further with respect to block 408.

As the bandwidth of the receiver changes, the portion of the frequency spectrum over which the noise is measured also changes. Because the noise is measured over the receiver bandwidth, a narrowing of the bandwidth may cause the measured noise level to decrease. Thus, narrowing of the bandwidth will typically also cause an increase in the SNR. The SNR may increase for at least the two following reasons. First, as the bandwidth decreases, less radio noise will typically be captured from the environment. Second, as the bandwidth decreases, less thermal noise from the receiver contributes to the total noise.

C. WCD Makes Sensitivity-Adjustment Determination

At block 406, the WCD 202 makes a sensitivity-adjustment determination, which may include at least two separate determinations that may be made in any order, simultaneously, or according to some other approach suitable for a given implementation. The first of these two separate determinations is a determination that the signal power level is less than a current sensitivity threshold of the receiver, and the second is a determination that the SNR of the signal power level to the noise power level is greater than an SNR threshold.

1. First Sub-Determination of Sensitivity-Adjustment Determination

In at least one embodiment, the making of the first of those two determinations involves the WCD 202 comparing the power level of the received signal to a sensitivity threshold. The sensitivity threshold may be based on a minimum detectible signal power level of the receiver. In some embodiments, the WCD 202 may set the sensitivity threshold equal to the minimum detectible signal power level plus a buffer (i.e., an offset) level. For example, the receiver may have a minimum detectible signal power level equal to −118 dBm (i.e., decibels relative to 1 milliwatt of power). As one example, the WCD 202 may set the sensitivity threshold at 5 decibels (dB) greater than the minimum detectible signal power level. Therefore, in this example, the sensitivity threshold would equal −113 dBm.

As used in this description, the minimum detectible signal power level is the power level that received signals must be greater than (or greater than or equal to in some embodiments) in order for the receiver/WCD system to be able to process the received signals. The formula to determine a minimum detectible signal power level may be:

$$\text{Minimum Dectectible Signal Power Level} = k \times T \times B \times oSNR_{threshold} \quad \text{(Equation 1)}$$

As shown in Equation 1 above, the minimum detectible signal power level of a receiver is a function of (i) the noise temperature (T) of the receiver, (ii) the bandwidth (B) of the receiver, and (iii) the oSNR threshold ($oSNR_{threshold}$) of the receiver. The $oSNR_{threshold}$ is the value above which the SNR that is output by the receiver must be to enable decoding of the signal, and as described above is related to the signaling mode being used to encode (and thus decode) the received signals. As Equation 1 shows, as the noise temperature, bandwidth, and/or the $oSNR_{threshold}$ of a receiver increase, the minimum detectible signal power level increases (proportionally) as well. Thus, increasing the bandwidth of a receiver increases the receiver's minimum detectible signal power level, which corresponds in a practical sense to the fact that the increase in receiver bandwidth makes it more difficult for the receiver to detect weak signals. Similarly, increasing the required oSNR (i.e., the $oSNR_{threshold}$) by switching the receiver to a signaling mode that requires a higher $oSNR_{threshold}$ increases the sensitivity threshold.

In Equation 1 above, k represents what is known in the art as the Boltzmann constant, which is a constant that relates the energy inherent in a material to the temperature of the material. As stated above, the value T in Equation 1 above represents the noise temperature of the receiver (and antenna). The noise temperature may be the actual physical temperature of the components of the system. As the physical temperature increases, the atoms that form the receiver have more thermal energy. A portion of this thermal energy will be measured by the receiver system as radio noise.

When the noise temperature is multiplied by the Boltzmann constant, the result is a noise power that is present as white noise (i.e., noise at all frequencies) in the receiver. When receiving a signal, this white noise may manifest as noise across the receiver bandwidth in the received signal. Thus, to determine how much thermal noise power is present in the receiver, the noise power is multiplied by the value of B (bandwidth) to determine the noise power across the full bandwidth of the receiver. At the output of the receiver, the thermal noise power and the received radio noise are virtually indistinguishable. Therefore, all noise sources (both internal and external to the system) contribute to the total noise in a system.

In various different embodiments, the WCD 202 may set the sensitivity threshold in different ways. For example, the sensitivity threshold maybe dynamically set based on operating conditions of the WCD 202. In one embodiment, the sensitivity threshold may increase or decrease depending on the measured noise power level. In other embodiments, the WCD 202 may use a mathematical formula to determine the sensitivity threshold. In an example mathematical formula, the WCD 202 may predict the change in power level of the received signal. In this example, the WCD 202 may determine that the power level of the received signal is decreasing at a rate that may cause the power level to fall below the minimum detectable signal power level. Thus, in this example, the WCD 202 may determine that the received signal power level is below the sensitivity threshold. In some embodiments, the sensitivity threshold may be derived as a function of the minimum detectible signal power level, the power level of the received signal, and the rate of change of the power level of the received signal.

2. Second Sub-Determination of Sensitivity-Adjustment Determination

The second of the two sub-determinations of the sensitivity-adjustment determination involves the WCD 202 determining an SNR is greater than an SNR threshold. In various different embodiments, the WCD 202 may do so in connection with one or both of at least two different SNRs that are present in the system. One such SNR is known as the measured SNR (mSNR) and is described further below, and the other is the above-described oSNR.

The mSNR indicates how much noise is present in a radio environment as received by the antenna compared to an as-received power level of a received signal, and can thus be thought of as an SNR as measured between an antenna and a receiver. In embodiments where the second sub-determination of block 406 is carried out in connection with an mSNR, a suitable mSNR threshold would be used for comparison, to assess the ambient radio environment. As discussed above, the oSNR relates to the quality of the signal as compared with the combined ambient and internal noise, and is thus an SNR measured at the output of the receiver.

D. WCD Responsively Adjusts Sensitivity Threshold of Receiver

At block 408, responsive to making the sensitivity-adjustment determination at block 406, the WCD 202 adjusts its receiver from having the current sensitivity threshold to having an adjusted sensitivity threshold that is less than or equal to the signal power level measured at block 402. Referencing Equation 1 above, the WCD 202 may determine a value for the adjusted sensitivity threshold by changing an offset or buffer added to a calculated minimum detectible signal power. Thus, if the current sensitivity threshold was equal to the result of Equation 1 plus an offset of 5 dBm, an example adjusted sensitivity threshold could be the result of Equation 1 plus only 2 dBm. And certainly numerous other examples could be listed.

In addition to or instead of changing an offset value (if one is even used, which it is not in some embodiments), the carrying out of block 408 may involve the WCD 202 changing the values of one or two of the variables in the above-described Equation 1. As is clear from that description, neither k (the Boltzmann constant) nor T (the noise temperature) are controllable or changeable by the WCD 202. The other two variables, however, are. That is, the carrying out of block 408 may involve the WCD 202 changing the values of one or both of B (bandwidth being received by the receiver) and the $oSNR_{threshold}$.

With respect to bandwidth, the WCD 202 may set its receiver to having an adjusted sensitivity threshold that is less than or equal to the signal power level measured at block 402 by decreasing the bandwidth of the receiver, which decreases the amount of noise received by the receiver, thus increasing the ability of the receiver to detect and decode weaker signals.

The bandwidth may be decreased based on a particular frequency of a received signal. For example, the received signal may have a frequency of 875 MHz, and the WCD 202 may adjust the bandwidth of the receiver around that signal. The receiver in the WCD 202 may be configured (perhaps by default) to receive a bandwidth that spans across the full spectrum of the frequency band of operation. In the present example, the receiver may be configured to receive signals on the frequency band spanning 869-894 MHz. However, when receiving the above-mentioned 875 MHz signal, the bandwidth may be reduced to span only 870-880 MHz. Thus, in the present example, the bandwidth can be reduced from 25 MHz (i.e. the difference between 894 and 869 MHz) to 10 MHz (i.e. the difference between 880 and 870 MHz).

Because of this 60% reduction in bandwidth, the receiver's minimum detectible signal power level will decrease by approximately 4 decibels (dB). Therefore, the receiver will be able to detect signals that are 4 dB weaker after the adjustment in bandwidth. Thus, because the receiver's sensitivity threshold may be based on the minimum detectible signal power level, the receiver's sensitivity threshold may decrease by 4 dB as well. The above example is just one way the bandwidth may be adjusted. In other situations, the bandwidth may be reduced by a greater or lesser amount. Further, the bandwidth may also be reduced based on other criteria. In some embodiments, the BTS 204 may communicate a signal to the WCD 202 indicating a bandwidth reduction, and the WCD 202 may responsively reduce its bandwidth accordingly.

With respect to the oSNR threshold, in some embodiments the WCD 202 may communicate a request to the BTS 204 for a change of signaling mode (modulation). In some embodiments, the WCD 202 may begin communicating with the BTS 204 using the desired modulation in order to effect a change in the signaling mode and thus the oSNR threshold. As can be appreciated from examining Equation 1, the minimum detectible signal power (and accordingly a sensitivity threshold derived from the minimum detectible signal power) can be reduced by switching from a given oSNR threshold to a lower oSNR threshold (i.e., one associated with a less complicated (i.e., lower order) modulation that would also permit a lower maximum data throughput), thus better enabling the WCD 202 to put in place an adjusted sensitivity threshold that is less than or equal to the signal power level measured at block 402.

In various different embodiments, the WCD 202 may adjust the sensitivity threshold of its receiver by doing one or both of reducing the bandwidth and changing the oSNR threshold. Various combinations of these approaches may be used depending on the specific operating scenario. For example, if data speed is a priority, reducing the receiver's bandwidth may be chosen while leaving the selected modulation scheme unchanged. In another example, if maintaining a communication link regardless of data speed is a priority, the WCD 202 could both reduce the bandwidth and change the data modulation, or perhaps change only the modulation. And certainly many other examples are possible as well in various different implementations.

IV. Conclusion

While some example embodiments have been described above, those of ordinary skill in the art will appreciate that numerous changes to the described embodiments could be made without departing from the scope and spirit of the claims.

What is claimed is:

1. A method carried out by a wireless communication device comprising a receiver, the method comprising:
    measuring a signal power level of a received signal;
    measuring a noise power level, wherein measuring the noise power level comprises measuring the noise power level over a bandwidth of the receiver;
    making a sensitivity-adjustment determination, wherein the sensitivity-adjustment determination comprises a determination that the signal power level is less than a current sensitivity threshold of the receiver, wherein the sensitivity-adjustment determination further comprises a determination that a signal-to-noise ratio (SNR) of the signal power level to the noise power level is greater than a SNR threshold; and
    responsive to making the sensitivity-adjustment determination, adjusting the receiver from having the current sensitivity threshold to having an adjusted sensitivity threshold that is less than or equal to the signal power level.

2. The method of claim 1, wherein the SNR is a measured SNR (mSNR) and the SNR threshold is an mSNR threshold.

3. The method of claim 1, wherein the SNR is an output SNR (oSNR) and the SNR threshold is an oSNR threshold.

4. The method of claim 1, wherein adjusting the receiver comprises reducing a bandwidth of the receiver.

5. The method of claim 1, wherein adjusting the receiver comprises reducing an output signal-to-noise ratio (oSNR) of the receiver.

6. The method of claim 5, wherein reducing the oSNR comprises operating the receiver with a signaling mode with a lower associated oSNR.

7. The method of claim 6, further comprising the wireless communication sending a communication to the base station specifying a change in the signaling mode.

8. The method of claim 1, wherein the sensitivity threshold of the receiver is a minimum detectible power for signals received by the receiver.

9. The method of claim 1, wherein the sensitivity threshold of the receiver is a predetermined amount of power greater than a minimum detectible power for signals received by the receiver.

10. The method of claim 1, wherein measuring a signal power level of a received signal comprises measuring the noise power level over a bandwidth of the receiver.

11. A wireless communication device comprising:
    at least one wireless-communication interface comprising a receiver;
    at least one processor; and
    data storage containing program instructions executable by the at least one processor for:
        measuring a signal power level of a received signal;
        measuring a noise power level, wherein measuring the noise power level comprises measuring the noise power level over a bandwidth of the receiver;
        making a sensitivity-adjustment determination, wherein the sensitivity-adjustment determination comprises a determination that the signal power level is less than a current sensitivity threshold of the receiver, wherein the sensitivity-adjustment determination further comprises a determination that a signal-to-noise ratio (SNR) of the signal power level to the noise power level is greater than a SNR threshold; and
        responsive to making the sensitivity-adjustment determination, adjusting the receiver from having the current sensitivity threshold to having an adjusted sensitivity threshold that is less than or equal to the signal power level.

12. The wireless communication device of claim 10, wherein the SNR is a measured SNR (mSNR) and the SNR threshold is an mSNR threshold.

13. The wireless communication device of claim 10, wherein the SNR is an output SNR (oSNR) and the SNR threshold is an oSNR threshold.

14. The wireless communication device of claim 10, wherein adjusting the receiver comprises reducing a bandwidth of the receiver.

15. The wireless communication device of claim 10, wherein adjusting the receiver comprises reducing an output signal-to-noise ratio (oSNR) of the receiver.

16. The wireless communication device of claim 15, wherein reducing the oSNR comprises operating the receiver with a signaling mode with a lower associated oSNR.

17. The wireless communication device of claim 16, further comprising the wireless communication sending a communication to the base station specifying a change in the signaling mode.

18. The wireless communication device of claim 10, wherein the sensitivity threshold of the receiver is a minimum detectible power for signals received by the receiver.

19. The wireless communication device of claim 10, wherein the sensitivity threshold of the receiver is a predetermined amount of power greater than a minimum detectible power for signals received by the receiver.

* * * * *